United States Patent
Lee

(10) Patent No.: US 10,668,689 B2
(45) Date of Patent: Jun. 2, 2020

(54) MULTI-LAYERED THERMOPLASTIC ELASTOMER FOAM AND PROCESS FOR MANUFACTURING THE SAME

(71) Applicant: Yung-Teng Lee, New Taipei (TW)

(72) Inventor: Yung-Teng Lee, New Taipei (TW)

(*) Notice: Subject to any disclaimer, the term of this patent is extended or adjusted under 35 U.S.C. 154(b) by 29 days.

(21) Appl. No.: 15/083,912

(22) Filed: Mar. 29, 2016

(65) Prior Publication Data

US 2016/0288455 A1    Oct. 6, 2016

(30) Foreign Application Priority Data

Apr. 1, 2015    (TW) ............... 104110761 A

(51) Int. Cl.
| | | |
|---|---|---|
| *B32B 5/18* | (2006.01) | |
| *B32B 5/14* | (2006.01) | |
| *B32B 5/32* | (2006.01) | |
| *B32B 7/10* | (2006.01) | |
| *B32B 25/16* | (2006.01) | |
| *B32B 25/18* | (2006.01) | |

(52) U.S. Cl.
CPC .............. *B32B 5/18* (2013.01); *B32B 5/142* (2013.01); *B32B 5/32* (2013.01); *B32B 7/10* (2013.01); *B32B 25/16* (2013.01); *B32B 25/18* (2013.01); *B32B 2250/22* (2013.01); *B32B 2250/248* (2013.01); *B32B 2266/025* (2013.01); *B32B 2266/0207* (2013.01); *B32B 2266/0214* (2013.01); *B32B 2266/0221* (2013.01); *B32B 2266/0228* (2013.01); *B32B 2266/0235* (2013.01); *B32B 2266/0257* (2013.01); *B32B 2266/0278* (2013.01); *B32B 2266/0292* (2013.01); *B32B 2274/00* (2013.01); *B32B 2307/54* (2013.01); *B32B 2307/72* (2013.01); *B32B 2307/732* (2013.01); *B32B 2307/748* (2013.01)

(58) Field of Classification Search
CPC .... B32B 5/18; B32B 5/32; B32B 5/20; B32B 2307/51; B32B 2250/22
See application file for complete search history.

(56) References Cited

U.S. PATENT DOCUMENTS

| | | | | |
|---|---|---|---|---|
| 6,072,394 A | * | 6/2000 | Hasegawa ............ | G08B 13/242 29/25.42 |
| 2003/0052431 A1 | * | 3/2003 | Shah ..................... | C08J 9/122 264/50 |
| 2004/0116601 A1 | * | 6/2004 | Hall ...................... | C08G 81/021 525/88 |
| 2005/0282920 A1 | * | 12/2005 | Wu ........................ | B29C 44/06 521/54 |
| 2007/0172683 A1 | | 7/2007 | Ito et al. | |

(Continued)

FOREIGN PATENT DOCUMENTS

| | | |
|---|---|---|
| CN | 1788973 A | 6/2006 |
| CN | 1853897 A | 11/2006 |
| JP | 2005-231134 A | 9/2005 |

*Primary Examiner* — Hai Vo
(74) *Attorney, Agent, or Firm* — Hoffmann & Baron, LLP

(57) ABSTRACT

The present invention is related to a multi-layered thermoplastic elastomer (TPE) foam. Due to a specific formulation of the multi-layered TPE foam, adjacent layers of said TPE foam can be perfectly adhered to each other without adhesive or thermocompression after foaming. The present invention is also related to a specific process for forming a multi-layered foam.

5 Claims, 1 Drawing Sheet

(56) References Cited

U.S. PATENT DOCUMENTS

| | | | |
|---|---|---|---|
| 2009/0286893 A1* | 11/2009 | Shih .................... | B32B 5/18 |
| | | | 521/54 |
| 2010/0099784 A1* | 4/2010 | Su ....................... | C08J 9/0061 |
| | | | 521/95 |
| 2013/0210945 A1* | 8/2013 | Picot .................... | C08J 3/246 |
| | | | 521/89 |
| 2014/0207094 A1* | 7/2014 | Chang ................. | A61L 28/0026 |
| | | | 604/333 |
| 2015/0166755 A1* | 6/2015 | Kim ..................... | C08K 5/09 |
| | | | 521/139 |

* cited by examiner

MULTI-LAYERED THERMOPLASTIC ELASTOMER FOAM AND PROCESS FOR MANUFACTURING THE SAME

CROSS-REFERENCE TO RELATED APPLICATIONS

The present invention claims priority to Taiwan (R.O.C.) Patent Application No. 104110761 filed on Apr. 1, 2015, the contents of which are incorporated herein by reference in their entirety.

BACKGROUND OF THE INVENTION

1. Field of the Invention

The present invention is related to a multi-layered thermoplastic elastomer (TPE) foam and a process for manufacturing the same, and in particular, to a TPE material that is a multi-layered structure after foaming and a method for manufacturing the same.

2. Description of the Related Art

At present, there are generally two types of foams, namely, plastic and rubber. The plastic foams, such as polyvinyl chloride (PVC), EVA and EVA/polyethylene (PE) foams, have advantages of being easy to process and shape and having artistic colors, but also have disadvantages such as poor elasticity, lack of grip properties and being difficult to recycle. On the other hand, conventional rubber foams, such as polystyrene-butadiene rubber (SBR) and chloroprene rubber, have disadvantages of being difficult to process, shape and recycle and having an odor, although rubber foams have advantages of having good elasticity and grip properties.

TPE foams are advantageous for having bright and white color, having good grip properties, being soft, being easy to post-process, and easy to recycle. In other words, TPE foams have advantages of both the plastic foams and conventional rubber foams. Moreover, TPE is not toxic but an environmentally friendly material, and therefore foam manufactured using TPE has gradually been gaining attention in the market.

However, a multi-layered TPE foam cannot be formed directly by using conventional processes. Without an adhesive and/or an intermediate fabric cloth layer, a multi-layered TEP material with a satisfactory adhesion cannot be obtained.

US 2009/0286893 discloses an improved process for manufacturing a multi-layered TPE form. The method including separately forming individual TPE foam layers and then combining all the layers by using an intermediate TEP membrane and a thermocompression step to obtain a multi-layered TPE foam. However, the process is complicated.

In view of the above problems, a simpler process for manufacturing a TPE foam still needs to be developed.

SUMMARY OF THE INVENTION

The first objective of the present invention is to provide a multi-layered thermoplastic elastomer (TPE) foam, which may be manufactured by foaming a TPE raw material composition with a specific component percentage.

The multi-layered TPE of the present invention would have a peeling strength of above 0.5 kgf/25 mm, or even above 1.0 kgf/25 mm without using an adhesive layer or an intermediate layer between adjacent layers of said TPE, and mechanical properties of the multi-layered TPE such as hardness, density, tensile strength, or elongation rate would satisfy the needs for commercial applications.

The second objective of the present invention is to provide a process for forming a multi-layered thermoplastic elastomer (TPE) foam including the following steps:

a) providing a TPE matrix, a cross-linking agent, a blowing agent and, optionally, other additives, and heating the same by a kneader until the mixture melts and is uniformly mixed so that the mixture forms a raw material mixture;

b) delivering the raw material mixture obtained in a) to a first mixer for stirring to dissipate heat and cool said mixture to 70° C. to 110° C., then transferring the same to a second mixer to form a continuous sheet of raw material, and cutting the obtained continuous sheet into separate raw material sheets;

c) stacking the different raw material sheets to form a multi-layered raw material sheet stack; and d) directly foaming the multi-layered raw material sheet stack obtained in c) and cooling the same to obtain a multi-layered TPE foam.

A multi-layered TPE foam can be directly manufactured in a single step of foaming, without thermocompression, by using the method of the present invention.

Another objective of the present invention is providing a multi-layered foaming TPE foam obtained by using the foregoing method.

DETAILED DESCRIPTION OF THE INVENTION

Figure 1:
FIG. 1 is a schematic diagram of a multi-layered TPE foam of the present invention, where upper layer 1 and lower layer 2 of the TPE foam are directly jointed without a fabric cloth layer or an adhesive layer.
Figure 2:
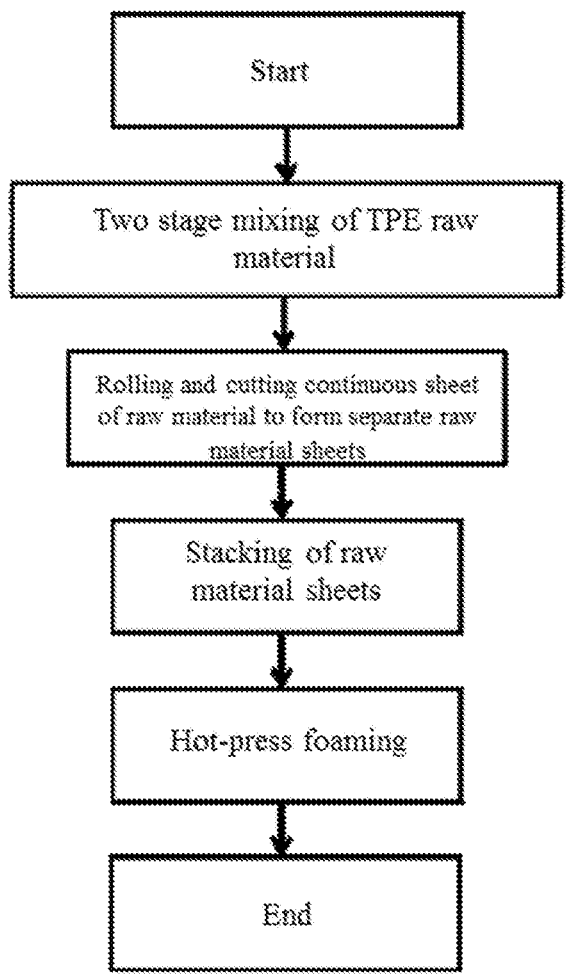
FIG. 2 is a flow chart of a method for forming a multi-layered TPE foam.

The first objective of the present invention is to provide a multi-layered thermoplastic elastomer (TPE) foam, which may be manufactured by foaming a TPE raw material composition with a specific component percentage.

Specifically, the multi-layered TPE foam of the present invention is manufactured by foaming a TPE raw material composition that includes a matrix (that is, a base gel), a cross-linking agent (a cross linker) and a blowing agent of a specific type and percentage. In the raw material composition, other additives, such as a co-blowing agent, a cross-linking co-agent, a softener, and/or a filler, can be added as required.

The TPE matrix mainly comprises soft-block TPEs such as styrene-butadiene-styrene (SBS), styrene-ethylene/butylene-styrene (SEBS), styrene-isoprene-styrene (SIS), and styrene-ethylene-propylene-styrene (SEPS), polybutadiene, and maleic anhydride grafted styrene-ethylene/butylene-styrene (Maleic anhydride-grafted SEBS); however, other types of thermoplastic elastomers can be used. SBS, SEBS, SIS and polybutadiene are preferred.

The aforesaid soft-block base gels can be used separately or in combination according to desirable properties. If multiple types of base gels are used, the proportion of the different types can be adjusted as required. The total weight of the soft-block base gels should be 5 wt % to 95 wt %, based on the total weight of TPE matrix, and preferably occupies 50 wt % to 95 wt % of the total TPE matrix.

In addition to the soft-block base gels, the TPE matrix should also include a hard-block TPE matrix for providing rigidity; for example (but not limited to), polystyrene (PS) and poly phenylene oxide (PPO).

The total weight of the hard-block matrix should be 5 wt % to 95 wt % of the total TPE matrix, preferably 5 wt % to 50 wt %.

Other polymer matrixes may be added as required so as to adjust the properties of a material. The polymer matrix may be selected from a group consisting of low-density polyethylene (LDPE), high-density polyethylene (HDPE), ethylene-vinyl acetate (EVA), polypropylene (PP), thermoplastic polyurethane (TPU), acrylonitrile-butadiene-styrene copolymer (ABS), acrylonitrile-styrene copolymer (AS), nylon, a polyolefin elastomer (POE), and a mixture of the same. Basically, the content of the polymer matrix does not exceed 50 wt % of the total matrix weight.

The cross-linking agent used in the present invention is dicumyl peroxide (DCP) or bis(t-butylperoxy isopropy)benzene (BIPB). The weight ratio of the cross-linking agent to the total matrix should be in a range of 0.01:100 to 1.5:100, preferably 0.02:100 to 1:100.

The blowing agent of the present invention is selected from a group consisting of azodicarbonamide (AC), 4,4'-oxybis(benzenesulfonyl hydrazide) (OBSH), p-toluenesulfonhydrazide (TSH). The weight ratio of the blowing agent to the total matrix is in a range of 1:100 to 20:100, preferably 2:100 to 15:100.

In addition to the matrix, cross-linking agent, and blowing agent, a co-blowing agent, a cross-linking co-agent, a softener, a filler, and other functional additives may be added to the raw material composition of the present invention as required.

Co-blowing agents suitable for the present invention include, for example (but not limited to), zinc oxide (ZnO), zinc stearate (ZnSt), urea, salicylic acid, lead stearate (lead (II) stearate, PbSt), or a combination thereof. The amount of the co-blowing agent may be 20% to 100% of the dosage of the blowing agent.

Cross-linking co-agents suitable for the present invention may be, for example (but not limited to), triallyl cyanurate (TAC), trimethylol propane trimethacrylate (TRIM), and diaryl terephthalate (DATP), preferably TAC. The amount of the cross-linking co-agent may be 20% to 50% of the dosage of the cross-linking agent.

Softeners suitable for the present invention may be, for example (but not limited to), white mineral oil or naphthenic oil, preferably naphthenic oil.

Fillers suitable for the present invention may be selected from (but not limited to) calcium carbonate and talc and the like, preferably calcium carbonate. Preferably, the weight ratio of the filler to the total matrix does not exceed 40:100.

Other functional additives such as an anti-slip agent, an anti-static agent, an antioxidant, an ultraviolet (UV) absorbing agent, and a pigment may be added as required. The amount of the additives is not specifically limited, but generally the weight ratio of the additives to the total matrix is not greater than 5:100, preferably not greater than 3:100.

The TPE material formed by foaming the raw material composition comprising the aforesaid components has good physical properties, so a multi-layered TPE foam can be manufactured by directly extruding the raw material composition, cutting the same into raw material sheets of specific sizes, then stacking—and then directly foaming the same— without using an adhesive layer or an intermediate layer. Specifically, the multi-layered TPE foam formed by directly foaming the raw material composition would have a density of about 130 kg/m$^3$, even reaching a foaming density as low as 30 kg/m$^3$, a tensile strength greater than 2 kgf/m$^3$, or even greater than 4 kgf/m$^3$ (according to ASTM D412-06a, Die C), and an elongation rate greater than 50% or even greater than 100% or 150% (according to ASTMD412-06a, Die C). Particularly, a peeling strength between adjacent layers of said TPE foam would be above 0.5 kgf/25 mm, or even above 1 kgf/25 mm (sample: L×W=200 mm×25 mm, which is peeled by a tensile strength testing machine at a speed of 200 mm/min for testing, where a maximum bearing strength before the peeling is recorded).

All layers of the multi-layered TPE foam of the present invention may have the same or different properties. For example, a multi-layered TPE foam having uniform properties but with multiple colors can be formed by directly foaming a stack of multiple raw material sheets made of the same raw materials, except for different pigments being added to different sheets; or a multi-layered TPE foam having a soft upper layer and a hard lower layer can be formed by stacking a raw material sheet having a larger amount of blowing agent onto a raw material sheet having a smaller amount of blowing agent and forming the stack.

Another objective of the present invention is to provide a process for forming a multi-layered TPE foam, including the following steps:

a) providing a TPE matrix, a cross-linking agent, and a blowing agent, and other additives, and heating the same by a kneader until the mixture melts and is uniformly mixed so as to form a raw material mixture;

b) delivering the raw material mixture obtained in a) to a first mixer for stirring to dissipate heat and cool said mixture to 70 to 110° C., then transferring the same to a second mixer to form a continuous sheet of the raw material, and cutting the obtained sheet into separate raw material sheets;

c) stacking the different raw material sheets to form a multi-layered raw material sheet stack; and d) directly foaming the multi-layered raw material sheet stack obtained in step c) and cooling the same to obtain a multi-layered TPE foam.

Details of step a) to step d) are as follows:

Step a): Kneading

The individual components included in the raw material mixture of the present invention are stated as above. All the components can be added at a single stage and are then heated and kneaded to obtain a raw material mixture for use. However, to obtain a good multi-layered TPE foam, a multi-stage kneading method which includes the following step a1) and step a2) is preferred:

a1): transferring a TPE matrix, a polymer matrix (if used), a co-blowing agent, and other additives (for example, a softener or a filler) to a kneader, completely mixing and heating the above components until a melting stage is reached (depending on the type of the matrix, approximately in a range of 150° C. and 180° C.), and then cooling the mixture and pelleting to obtain TPE matrix pellets; and a2): transferring the TPE matrix pellets obtained in a1) to another kneader, adding a blowing agent, a cross-linking agent, and a cross-linking co-agent after the temperature reach 90° C. to 120° C., and continuously kneading until the mixture is uniformly dispersed.

The reasons for using the foregoing multi-stage kneading method are that:

The purpose of the first stage kneading is to uniformly mix the TPE matrix, the polymer matrix, and other additives.

The temperature at the first stage is high, and therefore the blowing agent, the cross-linking agent, and the cross-linking co-agent are added at a second stage that has a lower temperature so that their reactivity can be maintained.

Step b): Lamination and Cutting

The method of the present invention uses an approach of two-stage lamination. At the first stage, the raw material paste mixture obtained in step a) is transferred to a mixer for stirring to dissipate heat and cool the mixture to 70° C. to 110° C. so as to prevent exotherm generated by polymerization from influencing the cross-linking agent. The raw material composition is then transferred to a second mixer so that the raw material composition is laminated and manufactured into a continuous sheet of the raw material having a uniform thickness and a uniform width.

After the continuous sheet of the raw material is cooled, it is cut into separate raw material sheets with a desirable length. The cutting may be performed in any conventional method.

Step c): Stacking

Different raw material sheets (for example, raw material sheets that have different compositions or raw material sheets that have the same composition but different colors) are sequentially stacked as required so as to form a raw material sheet stack.

Step d): Foaming

The raw material sheet stack obtained in step c) is directly placed in a mold of an oil hydraulic press at a specific temperature and under pressure so as to perform multi-layered foaming A conventional foaming machine for EVA foaming may be used. Preferred foaming conditions are at a temperature of 150° C. to 180° C., under a pressure of 120 kg/m$^3$ to 200 kg/m$^3$, and for a period of 10 minutes to 60 minutes.

The foamed sheet stack is placed at room temperature for a period of time for cooling. The period of time for cooling varies along with the thickness of the material. Generally, the cooling time is from 20 minutes to 60 minutes.

After the foamed sheet stack is cooled, the multi-layered TPE foam of the present invention is obtained.

EXAMPLES

The present invention and its effects are illustrated in detail below by examples. It should be noted that the examples are used for further explaining the present invention only and are not intended to limit the scope of protection of the present invention. Any obvious modification or changes by a person skilled in the art falls within the scope of protection of this specification.

Example 1

40 parts of SBS (LCY 475), 30 parts of SIS (Shell, Kraton D1117), 25 parts of polybutadiene (TSRC, Taipol BR0150), 5 parts of POE (Dow Chemical, Engage EG8150), 15 parts of PS, 10 parts of PP, 50 parts of calcium carbonate, 20 parts of naphthenic oil, and 1.5 parts of ZnSt were placed in a kneader. Gradually heating the components to 160° C. for the first stage of kneading until the components being uniformly mixed. Cooling and pelleting the mixture using a pellet-making machine. Placing the obtained TPE matrix pellets, 7.5 parts of blowing agent AC, 0.25 part of cross-linking agent BIPB, and 0.075 part of cross-linking co-agent TAC (TCI Tokyo Chemical Industry Co., Ltd) in the kneader. Gradually heating the mixture to 100° C. for the second stage of kneading so as to obtain the raw material composition. The raw material composition was transferred to a first double-roller machine, cooled to 80° C., and then transferred to a second double-roller machine where the composition was cut into raw material sheets of 640 mm*990 mm*0.5 mm Two raw material sheets were stacked to form a raw material sheet stack, which was then placed in a foaming machine to perform TPE hot-press foaming at a temperature of 170° C. and under a pressure of 150 kg/m$^3$ for 20 minutes. Placing the obtained foam at room temperature for 20 minutes.

Example 2

Same as Example 1 except for OBSH being used instead of AC.

Example 3

Same as Example 1 except for maleic anhydride grafted SEBS (Shell Chemical, FG1901) being used instead of a part of the SBS, and ABS being used instead of PP.

Comparison Example 1

30 parts of SBS (LCY 475), 30 parts of SIS (Shell, Kraton D1117), 10 parts of maleic anhydride grafted SEBS (Shell Chemical, FG1901), 25 parts of polybutadiene (TSRC, Taipol BR0150), 5 parts of POE (Dow Chemical, Engage EG8150), 15 parts of PMMA, 10 parts of PET, 50 parts of calcium carbonate, 20 parts of naphthenic oil, and 1.5 parts of ZnSt were placed in a kneader. Gradually heating the components to 160° C. until the components are uniformly mixed. Cooling and pelleting the mixture using a pellet-making machine. Placing the obtained TPE matrix pellets, 7.5 parts of blowing agent AC, 0.25 part of cross-linking agent BIPB, and 0.075 part of cross-linking co-agent TAC (TCI Tokyo Chemical Industry Co., Ltd) into the kneader. Gradually heating the mixture to 140° C. for the second stage of kneading so as to obtain the raw material composition. The raw material composition was transferred to a first double-roller machine, cooled to 80° C., and then transferred to a second double-roller machine where the composition was cut into raw material sheets of 640 mm*990 mm*0.5 mm Two raw material sheets were stacked to form a raw material sheet stack, which was then placed in a foaming machine to perform TPE foaming at a temperature of 170° C. and under a pressure of 150 kg/m$^3$ for 20 minutes. No TPE foam could be formed.

Example 5

Mechanical Property Test

Tests of hardness, density, tensile strength, elongation rate, and peeling strength for the foregoing examples were conducted. The results are listed as follows:

|  | Example 1 | Example 2 | Example 3 | Comparison Example 1 |
| --- | --- | --- | --- | --- |
| SBS | 40 | 40 | 30 | 30 |
| Maleic anhydride grafted SEBS | — | — | 10 | 10 |
| SIS | 30 | 30 | 30 | 30 |
| Polybutadiene | 25 | 25 | 25 | 25 |
| POE | 5 | 5 | 5 | 5 |
| PS | 15 | 15 | 15 | — |

-continued

|  | Example 1 | Example 2 | Example 3 | Comparison Example 1 |
|---|---|---|---|---|
| PP | 10 | 10 | — | — |
| ABS | — | — | 10 | — |
| PMMA | — | — | — | 15 |
| PET | — | — | — | 10 |
| Calcium carbonate | 50 | 50 | 50 | 50 |
| Naphthenic oil | 20 | 20 | 16 | 20 |
| ZnSt | 1.5 | 1.5 | 1.5 | 1.5 |
| AC | 7.5 | — | 7.5 | 7.5 |
| OBSH | — | 7.5 | — | — |
| BIPB | 0.25 | 0.25 | 0.25 | 0.25 |
| TAC | 0.075 | 0.075 | 0.075 | 0.075 |
| Hardness * | 29 | 25 | 12 | ** |
| Density * (kg/m$^3$) | 132 | 136 | 130 | ** |
| Tensile strength * (kgf/m$^2$) | 5.34 | 6.85 | 5.20 | ** |
| Elongation rate * (%) | 155 | 124 | 180 | ** |
| Peeling strength * (kgf/25 mm) | 1.54 | 1.49 | 1.85 | ** |

* Test methods of the respective properties are as follows:
hardness: ASTM D2240-05;
density: ASTM D1056-07;
tensile strength: ASTM D412-06a, Die C;
elongation rate: ASTM D412-06a, Die C; and
peeling strength: sample L x W = 200 mm x 25 mm was peeled by a tensile strength testing machine at a speed of 200 mm/min for testing, and the maximum bearing strength before the sample being peeled was recorded.
** Tests could not be done because no foam was formed.

What is claimed is:

1. A multi-layered thermoplastic elastomer (TPE) foam, wherein no adhesive layer or intermediate layer is between adjacent layers of the TPE foam, and said TPE foam is manufactured by foaming a composition comprising:
   a soft-block TPE matrix which comprises styrene-butadiene-styrene (SBS), styrene-isoprene-styrene (SIS), and polybutadiene;
   a hard-block TPE matrix comprising polystyrene; wherein the TPE matrix comprises 5 to 95 wt % of soft-block TPE matrix and 95 to 5 wt % of hard-block TPE matrix based on the total weight of the TPE matrix;
   a polymer matrix selected from a group consisting of low-density polyethylene (LDPE), high-density polyethylene (HDPE), ethylene-vinyl acetate (EVA), polypropylene (PP), thermoplastic polyurethane (TPU), acrylonitrile-butadiene-styrene copolymer (ABS), acrylonitrile-styrene copolymer (AS), nylon, a polyolefin elastomer (POE), and a mixture thereof, wherein the amount of the polymer matrix does not exceed 50 wt % of the total matrix;
   a cross-linking agent which is bis(t-butylperoxy isopropylbenzene) (BIPB), wherein the weight ratio of the cross-linking agent to the total matrix is in a range of 0.02:100 to 1:100;
   a cross-linking co-agent which is triallyl cyanurate (TAC) present in an amount of 20 wt % to 50 wt % based upon the weight of the cross-linking agent;
   a blowing agent; and
   wherein the multi-layered TPE foam has a peeling strength between adjacent layers of said TPE foam is above 0.5 kgf/25 mm.

2. The multi-layered TPE foam according to claim 1, wherein the TPE foam has the following properties: a density greater than 30 kg/m$^3$, a tensile strength greater than 2 kgf/m$^2$, and an elongation rate greater than 50%.

3. The multi-layered TPE foam according to claim 1, wherein the weight ratio of the blowing agent to the total matrix is in a range of 1:100 to 20:100.

4. The multi-layered TPE foam according to claim 3, wherein the hard-block TPE matrix further comprises a poly phenylene oxide (PPO).

5. The multi-layered TPE foam according to claim 3, wherein the blowing agent is selected from a group consisting of azodicarbonamide (AC), 4,4'-oxybis(benzenesulfonyl hydrazide) (OBSH), p-toluenesulfonhydrazide (TSH), and a mixture thereof, and wherein the weight ratio of the blowing agent to the total matrix is in a range of 2:100 to 15:100.

* * * * *